Nov. 11, 1941.   W. ULM   2,262,215
CAMERA SHUTTER RELEASING MECHANISM
Filed Feb. 23, 1940
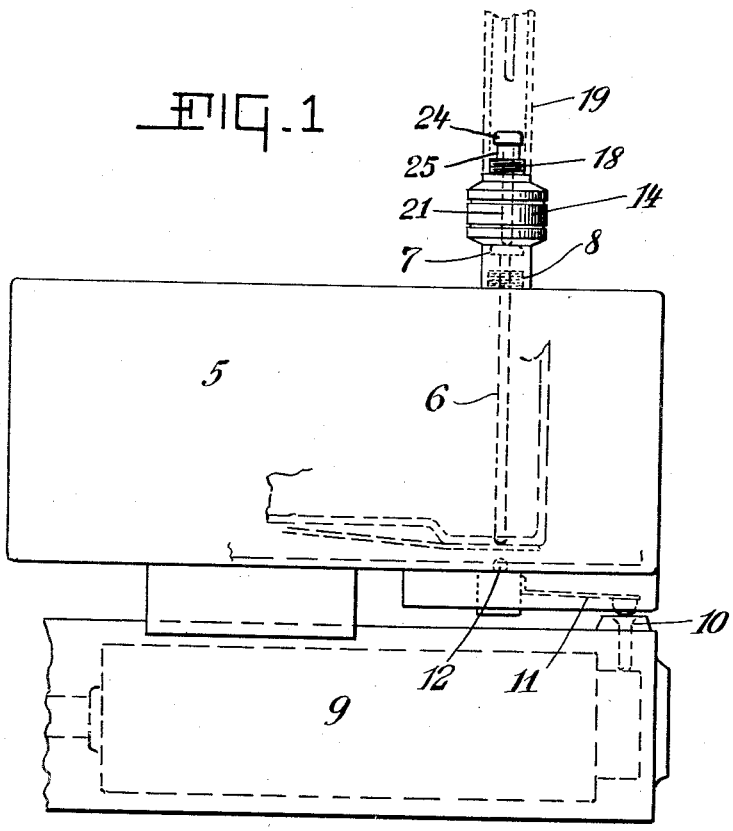
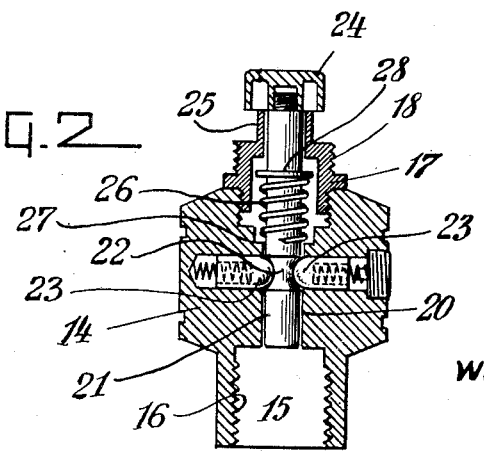
WILHELM ULM
INVENTOR Patented Nov. 11, 1941

2,262,215

UNITED STATES PATENT OFFICE 2,262,215

CAMERA SHUTTER RELEASING MECHANISM

Wilhelm Ulm, Woodhaven, N. Y., assignor, by mesne assignments, to E. Leitz, Inc., a corporation of New York Application February 23, 1940, Serial No. 320,312

1 Claim. (Cl. 67—29)

This invention relates to improvements in devices which are attached to a camera provided with a synchronized flashlight unit for the purpose of insuring that the release of the shutter and the firing of the lamp always take place at the same correct time interval irrespective of the pressure which the operator exerts upon the release button. Without such a device it may happen that if the operator depresses the release member with a slow pressure the shutter will be opened in advance of the closing of the electric circuit through the lamp and the exposure will be unevenly illuminated. The same undesirable result follows if the operator presses the release button with a quick blowlike pressure.

The object of this invention is to provide a device which insures that the release of the shutter and the firing of the lamp are correctly timed and automatically irrespective of the pressure exerted by the operator upon the release.

To this end the invention provides an auxiliary shutter release mechanism adapted to be attached to the camera to fit over the release button usually found upon the camera. The mechanism has a pin which is held in normally inactive position by springs means. In order to operate the camera release the operator must depress the pin against the resistance of the spring means. In other words he must exercise a predetermined pressure in order that the pin be released to operate the camera release. The releasing pressure is thus always the same so that it is immaterial whether the operator presses slowly or quickly. The mechanism will operate only if sufficient pressure is exerted to overcome the resistance of the spring means. It is a further feature of the invention to provide a small compact device as an article of manufacture to be attached to the camera by being screwed upon the screwthreads which usually are provided for attaching a cable release.

Accordingly the invention is embodied in an auxiliary shutter release mechanism arranged and constructed as hereinafter set forth and as illustrated in the accompanying drawing in which Fig. 1 is an outline view of a camera and flashlight unit with the mechanism attached.

Fig. 2 is an enlarged sectional view of the release mechanism.

The reference numeral 5 denotes a camera of the Leica type having a depressible shutter release 6 with a button 7 which projects above the camera casing. There is a threaded collar 8 on the camera for attaching a cable release. This is well known. To the camera is attached a flashlight unit 9 having a circuit terminal at 10 which is engaged by a contact 11 which in turn leads to another terminal 12. When the shutter release 6 is depressed it engages the terminal 12 and the circuit is closed and the lamp fired. All of the foregoing is clearly disclosed in U. S. Patent 2,224,674, Dec. 10, 1940, and need not be further described.

The auxiliary shutter release mechanism, Fig. 2, comprises a housing 14 having a bottom chamber 15 which fits over the collar 8 when the device is attached to the camera by the screwthreads 16. The chamber then encloses the release button 7 as will be understood. On top there is a detachable nipple 17 having outside threads 18 for attaching a cable release as shown dotted in Fig. 1 at 19. The housing has a central bore 20 through which a release pin 21 slides. The pin has an annular groove 22 which normally is engaged by spring pressed jaws 23, 23 as shown. The jaws hold the pin under a definite pressure exerted by the jaw springs. The pin has an operating head 24 which passes down on the outside of the neck 25 of the nipple. The pin carries a spring 26 for returning it to normal position. The spring acts between shoulders 27 and a collar 28.

The device is attached to the camera by screwing it on to the collar 8. This brings the bottom of the pin practically down upon the release button 7 to avoid lost motion. When an exposure is to be made the operator depresses the pin 21. The latter however, cannot move until the pressure is sufficient to overcome the gripping force of the spring pressed jaws 23 to displace the same. Then the pin moves down and the shutter is actuated. The operator then lets go of the pin which is then automatically returned to normal position by the spring 26. The parts are so proportioned of course that the pin 21 has a stroke long enough to insure that the camera release can contact the terminal 12 to close the circuit.

The camera 5 illustrated in this application and in the above mentioned Patent 2,224,674 is a camera of the well known Leica type which is provided with a focal plane shutter. When a flashlight synchronizer is used with a focal plane shutter camera it is of the utmost importance that releasing means such as herein disclosed be provided to insure correct timing of the opening of the shutter and the firing of the lamp. It is known that in a focal plane shutter the opening is in the form of a slit which moves across the film. If the lamp is fired too soon the first part of the film will be under-illuminated and vice versa. This results in poor pictures. If the operator depends upon finger pressure he is unable to control the timing. With a circular shutter the situation is different because the shutter opens outward from the center, i. e. gradual so one may rely upon the synchronization with the gradually rising curve of the lamp intensity. With a release means as herein disclosed the operator is assured that irrespective of the manual pressure the release of the shutter and the firing of the lamp occurs in correctly timed relation. This is of importance where the time is counted in fractions of a second.

The device is inexpensive to manufacture. It is easy to put on and remove and certain in action. It eliminates all uncertainty due to difference in pressure exerted upon the camera release button. It will be clear that while the invention is shown as attached to a camera of the Leica type it may easily be adapted for use with other cameras.

I claim:

In a combined camera and synchronized flashlight unit attached thereto, said camera having a depressible shutter release pin projecting through an exteriorly threaded collar, said pin being operable to release the camera shutter and close an electric circuit through said unit, an auxiliary detachable release device comprising a housing provided with a vertical bore terminating at the bottom in an interiorly threaded chamber to be screwed onto said collar to enclose said projecting pin, a release plunger slidably supported in said bore, spring actuated holding jaws in said housing supported transversely of said bore in engagement with said plunger to hold the same in a predetermined normal inactive position in operating contact with said camera release pin, a head on said plunger for manually depressing the same against the holding pressure of said jaws to move said plunger manually to depress said camera release pin and a single spring within said housing for automatically moving said plunger back into engagement with said spring actuated jaws after it has been depressed as aforesaid and the manual pressure thereupon has been removed.

WILHELM ULM.